United States Patent
Black et al.

(10) Patent No.: US 8,255,948 B1
(45) Date of Patent: Aug. 28, 2012

(54) DEMOGRAPHIC CLASSIFIERS FROM MEDIA CONTENT

(75) Inventors: Julie Black, Mountain View, CA (US); Lawrence P. Ip, Emerald Hills, CA (US); Emre Y. Baran, New York, NY (US)

(73) Assignee: Google Inc., Mountain View, CA (US)

( * ) Notice: Subject to any disclaimer, the term of this patent is extended or adjusted under 35 U.S.C. 154(b) by 565 days.

(21) Appl. No.: 12/108,260

(22) Filed: Apr. 23, 2008

(51) Int. Cl.
*H04N 7/025* (2006.01)

(52) U.S. Cl. ............... 725/35; 725/36; 709/219

(58) Field of Classification Search ............... 725/32–36; 709/217–231
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,285,999 B1 | 9/2001 | Page | |
| 6,401,075 B1 | 6/2002 | Mason et al. | |
| 6,588,015 B1 * | 7/2003 | Eyer et al. | 725/89 |
| 6,698,020 B1 * | 2/2004 | Zigmond et al. | 725/34 |
| 6,799,326 B2 * | 9/2004 | Boylan et al. | 725/35 |
| 6,985,882 B1 | 1/2006 | Del Sesto | |
| 7,039,599 B2 | 5/2006 | Merriman | |
| 7,065,544 B2 * | 6/2006 | Moreno | 708/422 |
| 7,136,875 B2 | 11/2006 | Anderson et al. | |
| 7,231,393 B1 | 6/2007 | Harik et al. | |
| 7,506,356 B2 * | 3/2009 | Gupta et al. | 725/116 |
| 7,634,786 B2 * | 12/2009 | Knee et al. | 725/35 |
| 7,647,299 B2 * | 1/2010 | Harik | 707/999.003 |
| 7,793,318 B2 * | 9/2010 | Deng | 725/19 |
| 7,937,405 B2 * | 5/2011 | Anderson et al. | 707/770 |
| 2004/0068697 A1 | 4/2004 | Harik et al. | |
| 2004/0267725 A1 * | 12/2004 | Harik | 707/3 |
| 2007/0078708 A1 | 4/2007 | Yu et al. | |

FOREIGN PATENT DOCUMENTS

WO   WO 97/21183   6/1997

OTHER PUBLICATIONS

95/001,073, Reexamination of Stone et al., filing date Sep. 30, 2004.

(Continued)

*Primary Examiner* — Annan Shang
(74) *Attorney, Agent, or Firm* — Fish & Richardson P.C.

(57) ABSTRACT

Methods, systems and computer program products for classifying incoming data and identifying relevant demographic information from the incoming data. The incoming data may include media content, and the media content may be classified to determine demographic information such as the audience of the media content associated with the media content related to a topic. A content item presented in another medium on the same topic also may be identified. Subsequently, appropriate advertising based on the demographic information to be associated with the content item may be provided.

22 Claims, 4 Drawing Sheets

OTHER PUBLICATIONS

95/001,061, Reexamination of Stone et al., filing date Sep. 3, 2002.
95/001,069, Reexamination of Dean et al., filing date Jul. 11, 2002.
95/001,068, Reexamination of Stone et al., filing date Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 Bl, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Brin, Sergey et al., "The Anatomy of a Large-Scale Hypertextual Search Engine" *Computer Networks and ISDN Systems 30*, Issue 1-7, Apr. 1998, pp. 107-117.
Lee, K., "Automatic Speech Recognition—The Development of the SPHINX System", Kluwer Academic Publishers, Norwell, Massachusetts, 15 pages, Nov. 30, 1988.

* cited by examiner

DEMOGRAPHIC CLASSIFIERS FROM MEDIA CONTENT

TECHNICAL FIELD

The subject matter of this application is generally related to information presentation.

BACKGROUND

Radio and television are two popular mediums for information and entertainment. Radio and television station audiences can span both listeners and viewers of content broadcast over the air, cable and satellite systems, as well as listeners and viewers of content streamed over a network. Radio and television have historically broadcasted their content to a wide, disperse, and undifferentiated audience. Advertisers often purchase programming slots based primarily on the viewer demographic for a particular associated program (e.g., radio and television programs). For example, advertisements ("ads") for beer have been known to be broadcast to viewers when live sporting events are televised (e.g., NFL games). Similarly, ads for toys are typically broadcast during programming directed at children.

Currently, a broad range of data including radio and television transcripts from radio and television programs is available for public access. Such data however is often in raw form and is not presented in a manner that facilitates accurate ad targeting for demographic groups most related to the data.

SUMMARY

An advertising targeting system may include a learning module and a classification engine for classifying the incoming data. The learning module and/or the classification engine may identify relevant demographic information from incoming data. In implementations in which the incoming data includes media content, the learning module and/or the classification engine may classify the media content, and infer or identify demographic information associated with the media content related to a topic. The learning module and/or the classification engine also may identify a content item presented in another medium on the same topic. Subsequently, the advertising targeting system may provide appropriate advertising based on the demographic information to be associated with the content item.

In some implementations, a method includes: inferring demographic information from a portion of broadcast media related to a topic; identifying a content item presented in another medium on the topic; and selecting advertising based on the demographic information to be associated with the content item.

In some implementations, a method includes: determining a topic associated with a portion of broadcast media; determining demographics information from the portion of broadcast media; receiving a request for providing advertising for association with a media item that relates to the topic; selecting advertising in accordance with the determined demographics; and providing the selected advertising. Determining demographics, in some implementations, may include determining demographic tags associated with advertising that is included with the broadcast media.

In other implementations, a system includes a processor and a computer-readable medium operatively coupled to the processor. The computer-readable medium includes instructions, which, when executed by the processor, causes the processor to perform operations including: inferring demographic information associated with a portion of broadcast media related to a topic; identifying a content item presented in another medium on the topic; and selecting advertising based on the demographic information to be associated with the content item.

Other implementations of classifying broadcast media and providing demographic information based on the broadcast media also are disclosed, including implementations directed to systems, methods, apparatuses, computer-readable mediums and user interfaces.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Advertising System Overview

Figure 1:
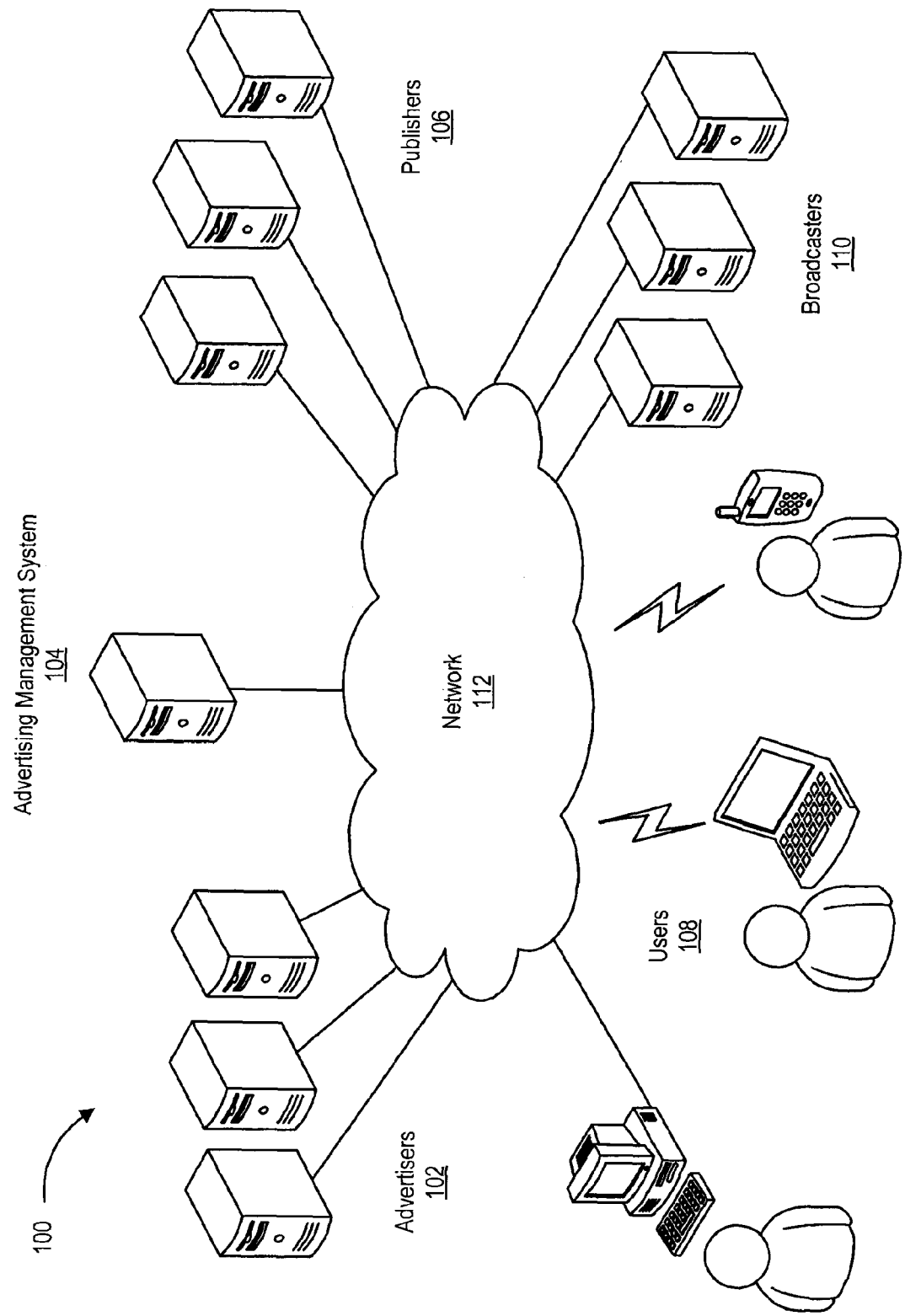
FIG. 1 is a block diagram of an example online advertising system.

FIG. 1 is a block diagram of an example online advertising system 100. In some implementations, one or more advertisers 102 can enter, maintain, and track advertisement ("ad") information in an advertising management system 104. The ads may be in the form of graphical ads, such as banner ads, text only ads, image ads, audio ads, video ads, ads combining one of more of any of such components, etc. The ads may also include embedded information, such as links, meta-information, and/or machine executable instructions. One or more publishers 106 may submit requests for ads to the system 104. The system 104 responds by sending ads to the requesting publisher 106 for placement along with publisher content (e.g., on a publisher's web properties (e.g., web sites and other network-distributed content)). While reference is made to providing ads, the system 100 can provide other forms of content including other forms of sponsored content. Further while reference is made to delivery of content over a network, such as to a web property, delivery can be accomplished to other devices (e.g., non-computer devices) and using other mediums (e.g., radio, cellular telephone).

Users 108 and advertisers 102 can provide usage information to the system 104, such as, for example, whether or not a conversion or click-through related to an ad has occurred. This usage information can include measured or observed user behavior related to ads that have been served. In some implementations, the system 104 performs financial transactions, such as crediting publishers 106 and charging advertisers 102 based on the usage information.

A computer network 112, such as a local area network (LAN), wide area network (WAN), the Internet, intranet, wireless network, peer-to-peer network, a wired or wireless network, a private network, a virtual private network (VPN) or a combination thereof, connects advertisers 102, publishers 106 and users 108 to the system 104.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). The content server can transmit information about the ads back to the ad server, including information describing how, when, and/or where the ads are to be/were rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia, and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of search results.

The search service can submit a request for ads to the system 104. The request may include a number of ads desired. This number may depend on the search results, the amount of screen or page space occupied by the search results, the size and shape of the ads, etc. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc. The search service can combine the search results with one or more of the ads provided by the system 104. This combined information can then be forwarded to the user 108 that requested the content.

In some implementations, the online advertising system 100 further includes one or more broadcasters 110. The broadcasters 110 may include, for example, video and audio broadcasting systems that may operate in communication environments including any type of broadcast station, broadcast television, cable television, satellite television, Internet communication systems (including Internet radio and Internet television), and other communication environments.

The broadcasters 110 may provide media content (e.g., audio, video, digital data streams, metadata, netcasts, podcasts, etc.) to the users 108. The users 108, in these implementations, may employ user devices such as cellular telephones, radios, televisions, or portable media or display players (e.g., mp3 players, portable TVs, etc.) to receive and present media content. The user devices also may be designed to receive broadcast media content from various broadcast sources. For example, a cellular provider may provide media content to a cellular telephone by broadcasting media content from a cellular transmitter. As another example, a radio may receive radio transmissions through which media content is embedded from a radio transmitter of a radio station. As yet another example, a portable media device may receive media content that is broadcast from a media server transmitter. The broadcasters 110 and various broadcast sources may implement wireless transmission and networking techniques such as Wireless Fidelity (WiFi), radio frequency, wireless networking protocol (e.g., IEEE standards for wireless networking (802.XX)), Bluetooth, or other similar wireless transmission methodologies and techniques.

The broadcasters 110 may process and play media content which may include music and advertisements according to playlists for play along with specific criteria for the play of that music, advertisement and/or playlists. In some implementations, the playlists 118 and media content 116 can be stored locally at the regional broadcast station 108.

Each broadcaster 110 may own one or more member stations (e.g., radio or television stations) locally or globally, such as in multiple cities or in multiple countries, and these member stations may share media content through the network 112. For instance, two remote broadcast stations (e.g., in different cities) may share media content across the network 112. Broadcasters 110 may include, without limitation, broadcast stations within a same market, within a same city, or within a same physical space (e.g., building).

The advertisers 102 may present ads to be aired to the broadcasters 110. In addition, the advertisers 102 can present metadata related to the ads to the broadcasters 110. The metadata can include information related to the type of ad, the target audience, preferred air times, and the like. The broadcasters 110 can air the ad based on the preferences specified by the advertisers 102.

In some implementations, the advertising management system 104 can receive the metadata from the advertisers 102. Based on the metadata, the advertising management system 104 may serve an appropriate ad to the broadcaster 110 to be aired/transmitted.

In some implementations, the advertising management system 104 can receive the metadata from the broadcasters 110. In some implementations, metadata related to specific ads can be pushed to the advertising management system 104. Alternatively, the advertising management system 104 can pull metadata related to one or more ads from the broadcasters 110, the advertisers 102, or both.

The advertising management system 104 can be additionally coupled to receive input from and send output to broadcasters 110. In addition, the advertisers 102 can present ads to the broadcasters 110 to be aired/published at times specified by the advertisers 102. For example, the advertisers 102 can push the ads to the advertising management system 104 which can, in turn, transmit the ads to the broadcasters 110 for presentation at one or more pre-determined times.

In some implementations, the broadcasters 110 can provide media content to the advertising management system 104. Alternatively, or in addition, the broadcasters 110 can provide the media content to the advertisers 102. The media content can include any type of content presented by the broadcasters 110, the schedule for presentation, availability of time slots for presenting ads, and the like. The advertisers 102 can choose one or more broadcasters 110 to present ads based on the media content. Alternatively, the advertisers 102, having chosen a particular broadcaster to present ads, can further determine specifics for presenting the ads based on the media content.

Advertising Processing System

Figure 2:
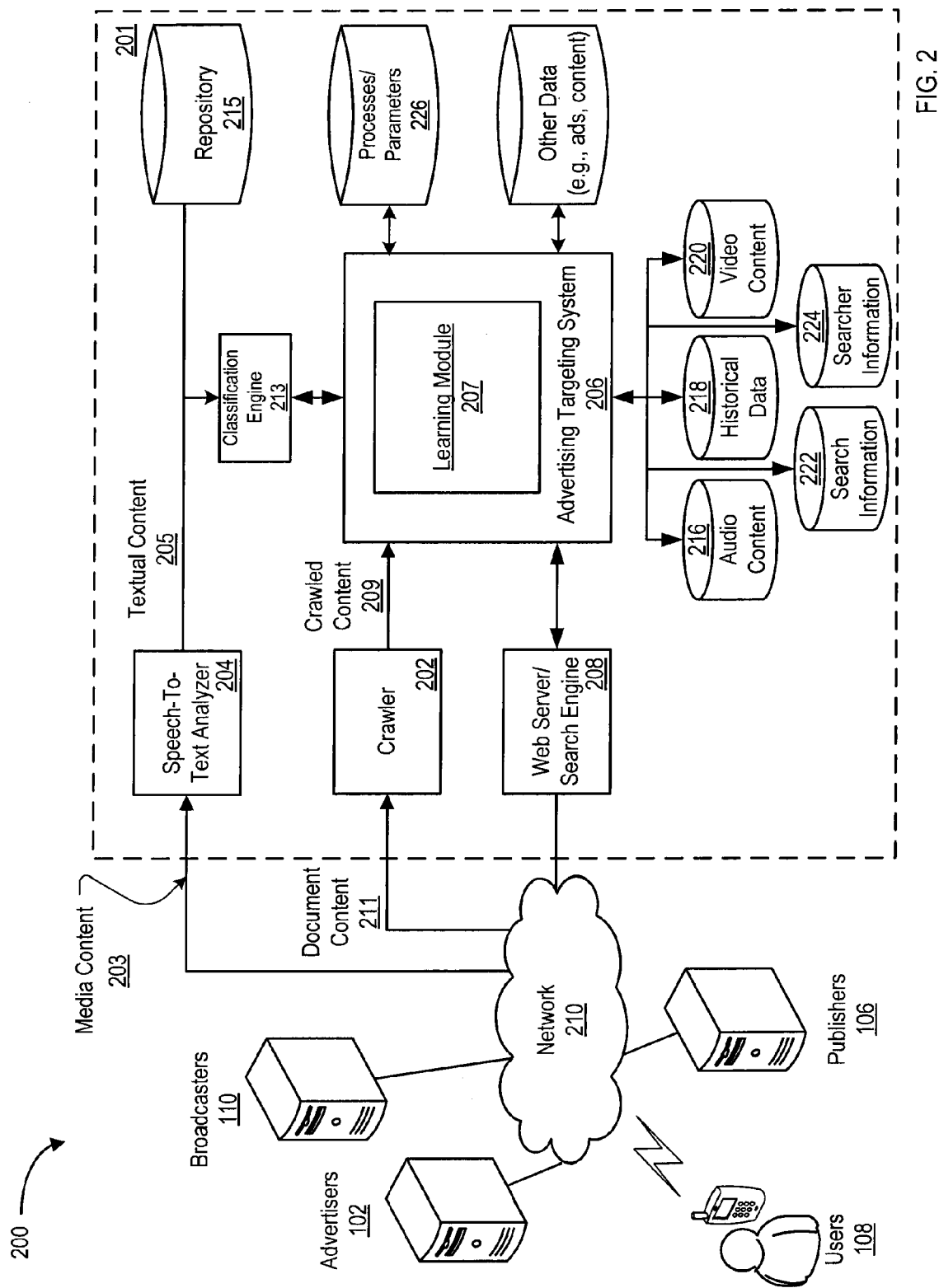
FIG. 2 is a block diagram of an example advertising management system.

FIG. 2 is a block diagram of an example advertising management system 200. In some implementations, the system 200 includes an advertising processing system 201. In some implementations, the advertising processing system 201 includes a crawler 202, a speech-to-text analyzer 204, an advertising targeting system 206, and a web server/search engine 208. The advertising processing system 201 is coupled to one or more users, advertisers and publishers through one or more networks 210 (e.g., Internet, intranet, wireless network, peer-to-peer network). Other implementations of system 200 are possible.

Crawler

In some implementations, the crawler 202 may receive as input one or more documents obtained from publishers 106, advertisers 102, users 108, broadcasters 110 or any other content sources, which include personalized media channels, blogs, forums, social networking or utility sites (e.g., MySpace™, YouTube™, FaceBook™).

A document may include any machine-readable and machine-storable work product. A document may be a web page, a file, a folder or combination of files, one or more files with embedded links to other files, etc. The files may be of any type, such as text, audio, image, video, etc. Parts of a document to be rendered to a user can be document content.

A document also may include structured data or unstructured data containing both content (e.g., words, pictures), and some indication of the meaning of that content (e.g., e-mail fields and associated data, HTML tags and associated data). In the context of the Internet, a common document is a web page. The document or document content can be obtained by crawling web pages of web properties owned or operated by publishers 106 or by any other suitable means. Web pages often include content and may include embedded information (e.g., meta information, media, hyperlinks) and/or embedded instructions (e.g., JavaScript®).

In some cases, a document has a unique, addressable, storage location and can therefore be uniquely identified by this addressable location. A Uniform Resource Locator (URL) is a unique address used to access information on the Internet. In these implementations, the crawler 202 may be a web crawler for crawling content of web pages. The crawler 202 can crawl through all the web pages and create an index of the content. Examples of web crawlers include open source crawlers written in Java®, such as Heritrix™, WebSPHINX™, JSpider™, WebEater™, Java Web Crawler™, WebLech™, Arachnid™, etc. Web pages can be crawled on a scheduled basis or in response to a trigger event, and the indexed content can be sorted and stored in an index server 214.

Content of a web page may contain information used by the crawler 202 to identify what keyword, section or heading may be related or linked to the web page. This information can include, without limitation, text within the web page, keywords (e.g., metadata) that describe the web page, frequencies of words occurring in the web page, font size of text in the web page (e.g., if one word has a larger font size, more emphasis can be given when associating the web page with keywords), or a hyperlink structure within the web page. Once identified, such information is output as crawled content 209 to the advertising targeting system 206. Examples of crawled content 209 may include, without limitation, terms or text appearing in the document content 211, embedded data, meta-information about the document content 211, and terms appearing in the URL for the document content 211.

In some implementations, the crawler 202 can function as a filter configured to filter out or otherwise identify content from the document content based on one or more filter criteria. In these implementations, the crawler 202 can be designed and/or tuned for use with a particular web property, media channel, document and the like.

Speech-To-Text Analyzer

The speech-to-text analyzer 204 can receive media content 203 from the broadcasters 110 through the network 210. Examples of media content 203 include, without limitation, radio or television programs, live or recorded musical works with lyrics, live or recorded dramatic works with dialog or a monolog, live or recorded talk shows, voice mail, and segments of an audio conversation. As will be discussed in greater detail below, the media content 203 may be converted to extract textual content using speech recognition, and information such as demographic information may be identified from the extracted content.

To perform speech recognition, a speech-to-text analyzer 204 may be provided which receives the media feeds (audio or video feeds) from the broadcasters 110 to produce corresponding hypothesized words. For example, the speech-to-text analyzer 204 may provide a text transcript of a press conference by converting the recording of the press conference into text.

Generally, the speech-to-text analyzer 204 may perform speech-to-text conversion using automated speech recognition techniques that are well known in the art. An exemplary speech recognition technique is disclosed in Kai-Fu Lee, "Automatic Speech Recognition—The Development of the SPHINX System," Kluwer Academic Publishers, Norwell, Mass., 1989; and in U.S. application Ser. No. 11/241,834, entitled "Using Speech Recognition to Determine Advertisements Relevant to Audio Content and/or Audio Content Relevant to Advertisements," filed Sep. 30, 2005, each of which is incorporated herein by reference in its entirety.

In some implementations, the media content 203 may include multimedia information or media information which contain information encoded with audio data. For example, audio data may include, without limitation, digitized and analog information encoded with audio signals, human voices (e.g., spoken language), audio sound captured and recorded by a microphone or other audio recording equipment, and synthesized audio (e.g., computer generated digital audio). Audio content may be stored in an audio content repository 216.

In some implementations, the media content 203 may include information encoded with video data. For example, video data may include, without limitation, video captured by a video camera, camcorder or other video recording equipment, images captured by a digital camera, and synthetic video (e.g., computer generated digital video). Video content may be stored in a video content repository 220.

The audio and video data may be streamed from live or pre-recorded events, including events that are televised or aired (e.g., a live concert, a pre-recorded talk show, etc.). As an example, the media content 203 may include an audio segment or segments of a televised reality show, including, for example, contestant conversation as well as theme music and sound effects, which can be converted into text information (e.g., lyrics).

The media content 203 also may include content streamed from motion picture events, including events that are incorporated into motion pictures. Motion picture events may include materials already captured in the form of a video, a movie or a film, as well as live events that are to be captured on video or film. In these implementations, the media content 203 may include an audio segment or segments of a motion picture event, including, for example, the audio content of a soundtrack and voiceover in a completed motion picture.

The media content 203 may include metadata associated with the media content. As an example, the media content 203 may include audio from a pre-recorded talk-show, and metadata included with the media content 203 may include the name of the show, the show host's name, the show's length, the language in which the show is recorded, the radio or television station that broadcasts the show, the date of recording, and the like. Other metadata may identify a director or producer, and other user-defined custom metadata. When the media content 203 includes ads (i.e., commercials) interjected during the show, the metadata may include the name of the advertiser, the length of the ad, the date the ad was created or received, and the like.

Media content 203 may carry information other than audio or video data, and may be transmitted between various stations and users using, for example, conventional electrical, optical, and satellite transmission means.

Textual content 205 generated by the speech-to-text analyzer 204 may be forwarded to the advertising targeting system 206. In some implementations, the textual content 205 may be encoded in an information stream, and streamed to the advertising targeting system 206 in real-time for text manipulation. Such manipulation may include, without limitation, searching the content, generating an index of the content, using the content for ad targeting and the like.

In some implementations, the speech-to-text analyzer 204 may convert and translate the received media content 203 to textual content 205 in one or more different languages prior to being forwarded to the advertising targeting system 206. For example, the speech-to-text analyzer 204 may convert an audio speech in Chinese into a textual document in Chinese, and translate the textual document into English.

The speech-to-text analyzer 204 may include voice recognition hardware and/or software for transcribing the received media content 203. In some implementations, if the received media content 203 includes an audio component, the audio component can be pre-processed to remove or reduce unwanted noise so as to maximize the accuracy of the output text. In some implementations, if the received media content 203 includes a textual component (e.g., description of a performance, synopsis of a show, etc.), or a graphical component (e.g., a picture, graph, diagram, etc.), such component may be crawled (e.g., by the crawler 202) to identify keywords and create an index of the keywords.

While the speech-to-text analyzer 204 is shown to be integrated with the advertising processing system 201, the speech-to-text analyzer 204 also may reside with the broadcasters 110. In these implementations, the broadcasters 110 may perform the speech-to-text conversion, and the output of which may be directly forwarded to the advertising targeting system 206.

Web Server/Search Engine

An ad request may be received by the advertising processing system 201. The ad request can be an actual request submitted by a user. For example, a user can submit an actual request by entering search criteria including one or more keywords into the web server/search engine 208. Similarly, the web server/search engine 208 can receive a request from a web page and can generate an actual ad request in the process of serving that page.

Machine Learning System

As discussed in the background, while a broad range of televised or aired data such as radio and television transcripts extracted from radio and television programs is available for public access, such data is often in raw form, limited and noisy in nature. Though topics discussed among these programs are salient and relate closely to information available online, no model or system currently exists for determining the audience most related to the raw data or to facilitate accurate ad targeting based on the information of such audience.

Advertising targeting system 206 includes a learning module 207. The learning module 207 includes a classification engine 213 for classifying the incoming data (e.g., the textual content 205 and crawled content 209). As will be described in greater detail below, the learning module 207 and/or the classification engine 213 may identify relevant demographic information from incoming data. In implementations in which the incoming data includes media content (e.g., an audio transcript), the learning module 207 and/or the classification engine 213 may classify the media content, and infer or identify demographic information (e.g., the audience of the media content) associated with the media content related to a topic (e.g., cooking). The learning module 207 and/or the classification engine 213 also may identify a content item (e.g., an online blog, an online newspaper article, etc.) presented in another medium (e.g., Internet) on the same topic (i.e., cooking). The advertising targeting system 206 may provide appropriate advertising based on the demographic information to be associated with the content item.

In some implementations, the learning module 207 (or the classification engine 213) may extract and remove data conveying personal information from the received media content prior to data classification so that any private information about an individual or a group of users or consumers may be filtered from the classified data. In these implementations, data received from the broadcasters 110 may be analyzed to exclude private data and/or personally identifiable information, where such data is blocked from or removed by the learning module 207 or the classification engine 213 to minimize the risk of private or personal information being traced back to an individual user or consumer.

The classification engine 213 may search for descriptive information in the incoming data to determine one or more categories (e.g., product or service categories) associated with the incoming data. A category, for example, is a grouping of related items (whether products or services). Simple categories can include only a single item; however, other categories can include several different items. As an example, a product category of fishing poles can include bamboo fishing poles and ice fishing poles, but not fishing bait. Items can belong to more than one category. For example, tomato may belong to the "fruit" category and "vegetable" category. In one implementation, the categories are arranged in a hierarchy (e.g., a tree or a directed acyclic graph). In the hierarchy, a category can include zero or more subcategories, where the contents of a category include each of the subcategories.

The classification engine 213 also may classify the incoming data by, for example, isolating or identifying topics and keywords in the incoming data. Specifically, the classification engine 213 may classify the incoming data by examining the content and form of the incoming data such that demographics and pyschographics data (e.g., content of interest to women and men of different age and income brackets who belong to a pre-defined set of categories possibly related to hobbies, games, sports, etc.) may be identified and extracted based on the classified data.

As an example, assuming that the incoming data includes transcription of a commercial pertaining to a local dentist, the classification engine 213 may identify keywords in the transcript such as "teeth", "gum" and "cavity". The classification engine 213 also may search for data that may convey personal information of the local dentist, such as age, sex, office location, office hour, professional information including educational background, and other data, such as contact information. The learning module 207 may subsequently categorize the incoming data as relating to "dental service" due to the presence of the above keywords. If desired, the classification engine 213 also may classify the incoming data based on any existing user demographic information that may have extracted and identified in any previous session to enhance the accuracy of the classification process.

In another implementation, the classification engine 213 may generate one or more classifier models which can be applied to the incoming data. The classifier models generated by the classification engine 213 can be used to process the incoming data to identify or produce demographic information or information conveying demographic data. The identified information may be stored in a repository 215 coupled to the classification engine 213 for convenient data access and retrieval. The repository may include one or more databases, digital file storage systems, tape libraries, and/or other systems for storing the converted text. For example, the repository may store information associated with one or more music recordings, shows or commercial recordings (e.g., TV shows, TV advertisements, public service announcements, promotional announcements, etc.).

The initial classification and categorization phase, which effectively classifies and maps the incoming data to one or more demographic groups, is iteratively improved in subsequent steps as the learning module 207 gradually collects training data. Typically, at least some of the resultant classifications will be erroneous. Misclassification can occur because a given word (e.g., "tomato") may fall under more than one category (e.g., "fruit" and "vegetable"), which can dramatically alter the specific demographic group(s) identified as being associated with the incoming data. Classification may be tuned based on categorizations that were correctly or incorrectly classified during the previous or preceding classification. In some implementations, the classifier is tuned by adjusting the value of the prior probabilities on which the classifier is based. For example, prior probabilities can be adjusted based on the number of times that a labeled query occurs in the collection of queries. In some implementations, tuning may be necessary if the collection of queries is not completely accurate (e.g., if the collection has missing or duplicate query logs).

In some implementations, the classification engine 213 (and the learning module 207) may use the identified information including those received and identified in previous sessions to further generate a reduced data set containing data that conveys one or more demographic groups as being associated with the incoming data, or alternatively indicates one or more potentially related demographic group(s). The reduced data set (and other processed data) may be provided to the learning module 207 as training data for enhancing the demographic models to be applied to the incoming data.

As an example, the classification module 213 may identify a name of a rock band in a radio transcript, which may include a segment of the lyrics of a song performed by the rock band. The identified name of the rock band and the song may be sent as training data for training the learning module 207. Based on the training data and data previously received from the classification module 213, the learning module 207 may determine that the genre of the song performed by the rock band. The learning module 207 also may recognize that the genre of the song matches the genre of music associated with listeners within a particular age demographic group (e.g., males of age 18-25). Assuming that sufficient data is available, the learning module 207 may perform qualitative analysis on the radio transcript which may yield detailed demographic information such as heterosexual males between ages 18 to 25 with earning power over $50,000 per year and who are mostly college students and enjoy playing guitars or drums.

The learning module 207, which can be built using training data extracted from the incoming data, communicates with the classification engine 213 to determine demographic data associated with the audience of the content. The demographic data can be used, for example, during an ad campaign (e.g., online ad campaign), for targeting ads most relevant to the demographic group(s) identified in the demographic data. In these implementations, the advertising targeting system 206 can be configured to dynamically select one or more ads from an advertisement repository based on the identified demographic groups, and present the ad(s) along with the incoming data to users.

In some implementations, the incoming data may be filtered by the learning module 207 (or the classification engine 213) to remove extraneous information and unrelated materials. One class of filters may include, for example, filters used for filtering out commercials. As an example, incoming data which includes an audio program may be screened to remove any commercial data or transcription that may have interrupted the program. The resulting data may then be analyzed to identify and obtain demographic information or information conveying demographic data using various techniques.

As another example, assuming that the incoming data includes an audio recording (e.g., a studio recording of a talk-show), the speech can be extracted (e.g., by the speech-to-text analyzer 204). The speech of the recording may include spoken dialogue, narration, and/or sung song lyrics. The speech may include a portion or portions of the audio track contained in the studio recording, of which music and other sound effects may be filtered and removed.

Once filtering is complete, the filtered data may be classified by the classification engine 213. For example, if the incoming data includes a transcription of a talk-show recording, elements in the transcription such as terms, phrases, concepts, taxonomy categories and topics may be extracted and used to classify the content in the incoming data. A suitable classification engine 213 may be a support vector machine (SVM). Other known classification systems also can be used in addition to or in replace of the classification engine 213 (e.g., decision trees).

Alternatively, content classifications can be determined using one or more text and/or image classifiers. Some examples of classifiers include but are not limited to: linear classifiers (e.g., Fisher's linear discriminant, logistic regression, Naive Bayes classifier, Perceptron), quadratic classifiers, k-nearest neighbor, boosting, decision trees, neural networks, Bayesian networks, hidden Markov models, etc. The classifier(s) may classify the incoming data into one or more categories or topics using hierarchical or non-hierarchical clustering algorithms for clustering the incoming data based on key features or traits (e.g., K-means, agglomerative clustering, QT Clust, fuzzy c-means, Shi-Malik algorithm, Meila-Shi algorithm, group average, single linkage, complete linkage, Ward algorithm, centroid, weighted group average).

An example of such a clustering algorithm to generate groups or clusters of words in a document is described in, for example, U.S. Patent Application Publication No. US 2004/0068697 A1, entitled "Method and Apparatus for Characterizing Documents Based on Clusters of Related Words", filed Sep. 30, 2003, and U.S. patent application Ser. No. 10/788,837, for "Method and Apparatus for Learning a Probabilistic Generative Model for Text," filed Feb. 26, 2004, the disclosure of each of which is incorporated herein by reference in its entirety.

A clustering algorithm partitions a data set (e.g., a set of web pages) into subsets or "clusters," so that data in each subset share a common trait or key feature. For example, if the incoming data includes a web page whose content is related to driving a car with a manual feature, then a clustering algorithm would detect such content (e.g., "car" and "manual") and assign the incoming data to one or more clusters associated with car (e.g., "automobile" or "driving school").

Once these clusters are defined, a word-to-cluster index may be produced. Using such an index, given a word or words, one or more clusters which include the words can be quickly and conveniently identified. One model that can be used to generate and/or identify such clusters is a probabilistic hierarchical inferential learner. In this model, a document (e.g., a web page) can be received as an input and clusters that match the content of the document can be returned. A term within such a cluster may be weighted by how statistically important it is to the cluster. Such clusters can include a range of a few terms to thousands of terms or hundreds of thousands of clusters that covers all languages in proportion to their search frequency. Further description with respect to the probabilistic hierarchical inferential learner can be found, in U.S. Provisional Patent Application Ser. No. 60/416,144, entitled "Methods and Apparatus for Probabilistic Hierarchical Inferential Learner", filed Oct. 3, 2002, the disclosure of which is incorporated herein by reference in its entirety.

If a clustering technique is used to generate relevant information, the learning model 207 may associate (e.g., map or index) the defined clusters to one or more concepts (e.g., terms that have different extensions but are treated identically (e.g., Stop, Halt, etc.)), or one or more categories (e.g., vertical categories that are groups of related products, services, industries, content formats, audience demographics, and/or topics that are likely to be found in a document) with each defined cluster to further refine the analysis. The concepts or categories may be filtered or reduced by scoring and applying scores to thresholds.

In some implementations, if the broadcasters 100 have annotated the incoming data (e.g., media content 203) with textual information or encoded textual information in the media content 203 (e.g., in packets, portions of packets, streams, headers, etc.), the textual information may be used by the learning model 207 to generate demographic information for ad targeting, bypassing the speech-to-text analyzer 204. For example, a broadcaster may provide, with the incoming data, a station identifier, a program identifier and the like. If the incoming data includes a song, such information may further include, for example, a song identifier, an artist identifier and an album identifier.

In another implementation, the incoming data may include subtitle or closed caption data. In this case, the speech data in the incoming data may be identified from the subtitle or closed caption data rather than from speech recognition applied to the audio portion of the incoming data. Classification techniques, such as those described above, may be applied to the subtitles or closed captions text to map the incoming data into, for example, one or more categories. Classification also can utilize natural language processing techniques to help process the incoming data, including segmentation, stemming, n-grams, and so on. In some implementations, incoming data may include metadata regarding its content. The incoming data may be mapped into, for examples, categories or topics by classifying the metadata using, for example, a clustering algorithm as described above. However, it should be appreciated that classification of the audio component of the incoming data is merely one example way of classifying the incoming data. Other ways include, without limitation, classifying based on the content of the web site of the station from which the incoming data are sent.

In some implementations, the advertising targeting system 206 can be configured to monitor one or more network locations on the network 210 to determine search information 222 and searcher information 224. In other implementations, search information 222, searcher information 224, and the like can be collected by external engines. In some implementations, the advertising targeting system 206 can be operatively coupled to the external engines to receive information including search information 222 and searcher information 224. The advertising targeting system 206 can be configured to monitor the external engines for updates to the search information 222 and searcher information 224 and receive updated information when a change is detected.

In some implementations, demographic identifiers can be used to select one or more processes and/or parameters 226 from a number of processes and/or parameters that are optimized for a particular application (e.g., content matching). In some implementations, optimization can be achieved by training algorithms or models with training sets that include a particular document type. For example, a set of home pages can be used to train a content matching algorithm (e.g., a classifier) to recognize content of home pages. In other implementations, a single content matching algorithm can be used to process different document types, but one or more parameters of the classifier algorithm can be initialize, replaced or otherwise modified to improve content matching for the document type indicated by the document type identifier.

Process for Identifying Demographic Groups

Figure 3:
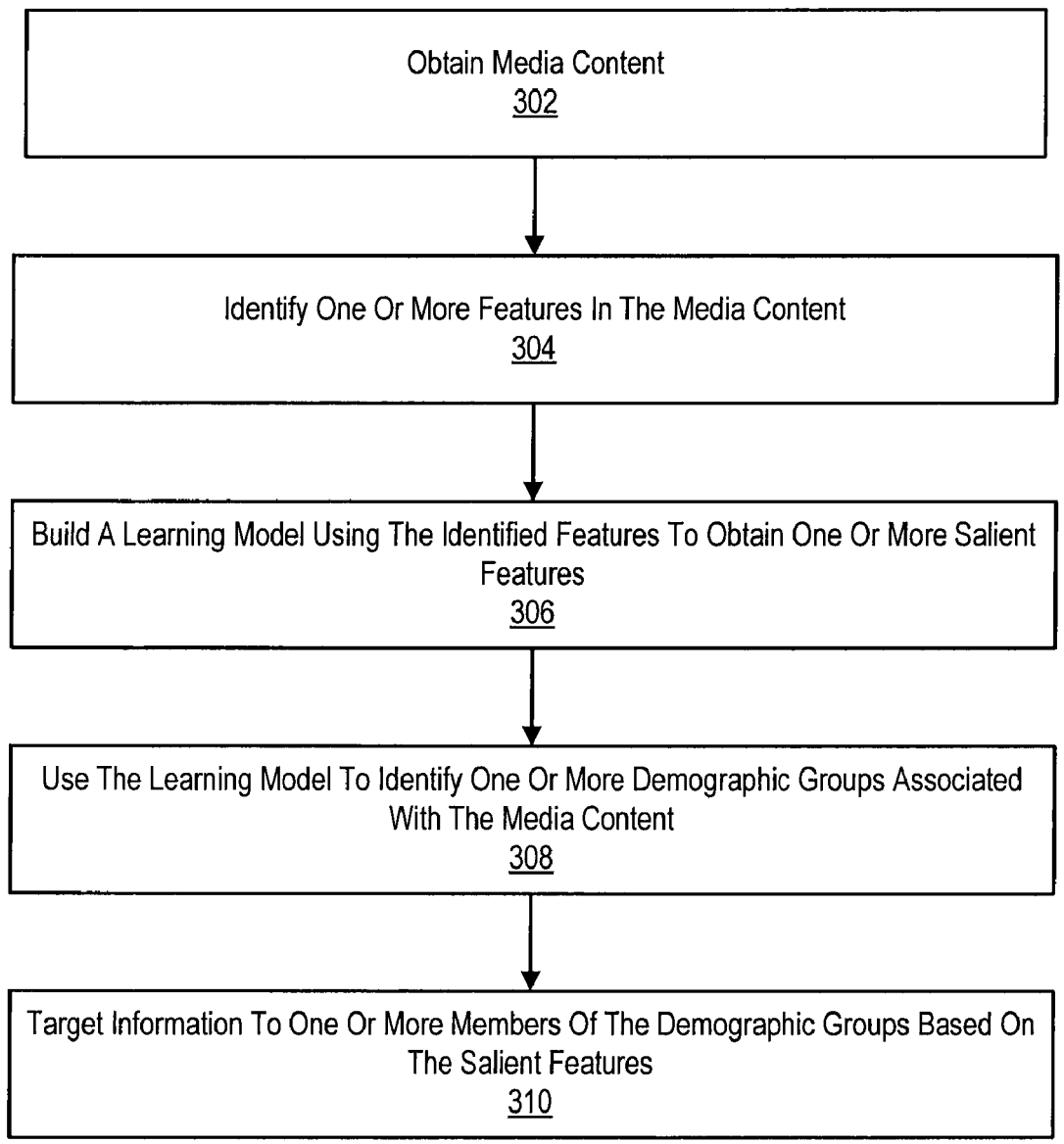
FIG. 3 is a flow diagram of an example process for identifying demographic groups associated with media content.

FIG. 3 is a flow diagram of an example process 300 for identifying demographic groups associated with media content. The process 300 may be performed, for example, by the advertising processing system 201, and for clarity of presentation, the description that follows uses that system as the basis of examples for describing the process 300. However, another system, or combination of systems, may be used to perform the process 300.

In the example shown, the process 300 begins with obtaining media content (302). Examples of media content include, without limitation, radio or television programs, live or recorded musical works with lyrics, live or recorded dramatic works with dialog or a monolog, live or recorded talk shows, voice mail, streaming content, and segments of an audio conversation. The obtained media content can be, for example, the media content 203, as discussed previously with respect to FIG. 2. The obtained media content can be received from broadcasters (e.g., broadcasters 110) over a network (e.g., network 210).

The process 300 includes identifying one or more features in the media content (304). For example, the obtained media content can be converted to textual content (e.g., by the speech-to-text analyzer 204 of FIG. 2). In some implementations, the media content is filtered before or after conversion to text, such as to remove commercials, music or background noise.

The textual content can be processed to identify descriptive keywords in the content which may identify one or more categories such as product or service categories. Categories can be identified, for example, by the classification engine 213, discussed previously with respect to FIG. 2. As another example, one or more classifier models can be generated (e.g., by the classification engine 213) which can be used to identify demographic information in the textual content. Classifier models can be generated, for example, using various technologies and methods, such as support vector machine, decision trees, linear classifiers, quadratic classifiers, k-nearest neighbor, boosting, neural networks, Bayesian networks, hidden Markov models, and clustering algorithms, to name a few examples.

Optionally, once features have been identified in the media content, a learning model is built using the identified features to obtain one or more salient features (306). For example, a learning model can be built by using training data. Training data can be generated by identifying correct and incorrect classifications from sample data. Iterative use of training data can improve classification accuracies of a learning model. As an example, the learning model 207 discussed previously with respect to FIG. 2 can be used. Identified categories may be filtered or reduced by scoring and applying scores to thresholds.

The process 300 includes identifying one or more demographic groups associated with the media content (308). For example, identified categories associated with the media content can be mapped to demographic groups. For example, some identified categories may be strongly associated with certain demographic groups of users, such as women, men, users having a certain income, users residing in particular locations, etc.

Once demographic groups have been identified, information may be targeted to one or more members of the demographic group(s) based on the salient features. For example, one or more advertisements can be identified (e.g., by the advertising management system 201) to be used in an advertising campaign targeted at users of the identified demographic group(s). Existing user demographic information also may be used in combination with the identified demographic groups in furnishing appropriate advertisements. Identified advertisements can be provided to publishers (e.g., publishers 106) to be presented with content targeted to the identified demographic group(s).

Generic Computer System

Figure 4:
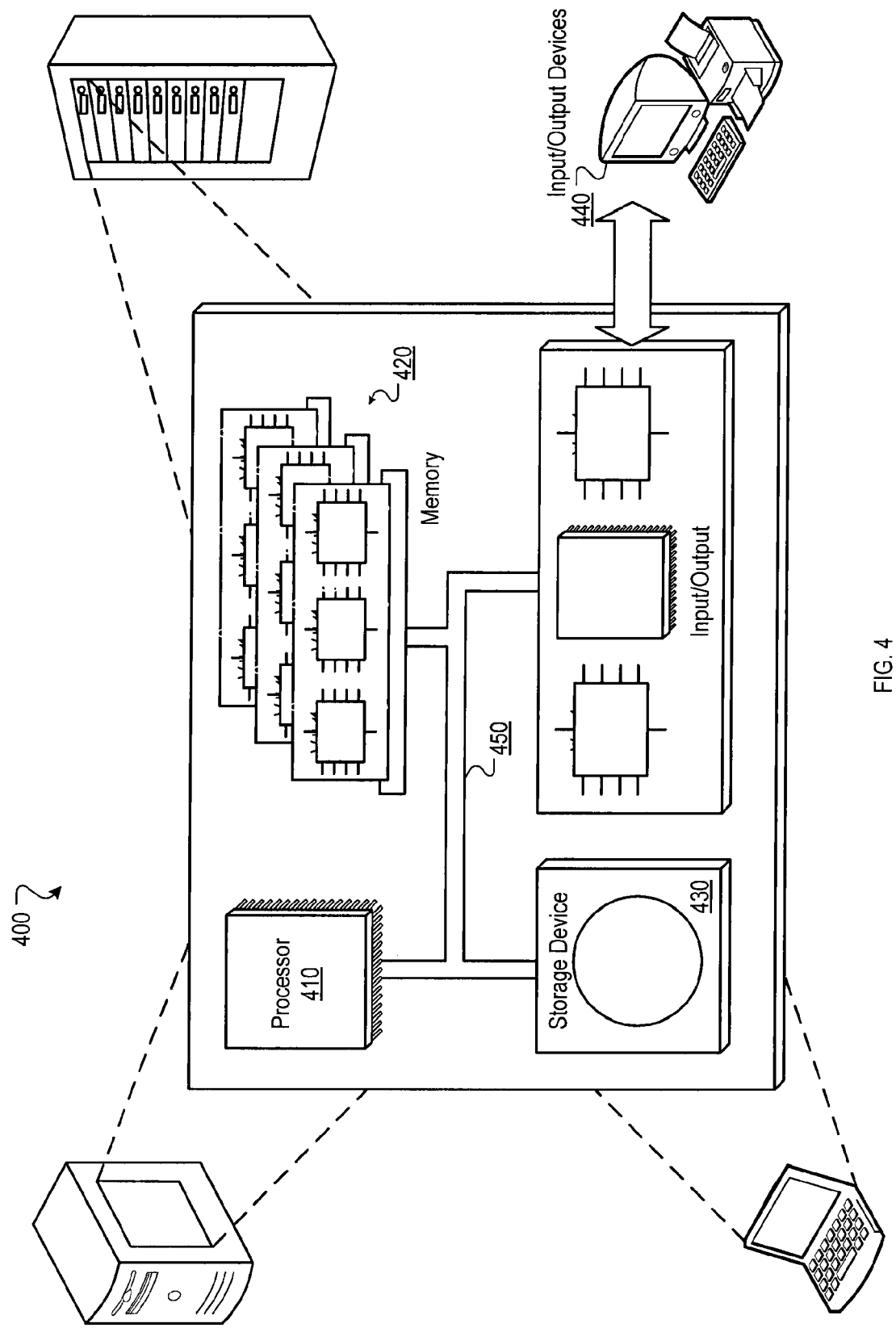
FIG. 4 is a block diagram of a generic processing device.

FIG. 4 is a block diagram of generic processing device that can be used to execute methods and processes disclosed. The system 400 can be used for the operations described in association with the method 300 according to one implementation. For example, the system 400 may be included in either or all of the advertising management system 104, the publishers 106, the advertisers 102, and the broadcasters 110.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The storage device 430 can be used, for example, to store information in the repository 215, the audio content 216, the historical data 218, the video content 220, the search information 222, and the processes/parameters 226.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the client A 102 and the server 104 may be implemented within the same computer system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   obtaining textual content generated from a portion of broadcast media;
   classifying the portion of broadcast media into one or more categories based on the textual content;
   determining demographics information for an audience of the portion of broadcast media;
   associating, by an advertising management system comprising one or more computers, the demographics information for the audience of the portion of broadcast media with the one or more categories;
   receiving a request for providing advertising for association with a web page that relates to a particular one of the one or more categories;
   selecting, by the advertising management system, advertising to be served with the web page based on the demographics information associated with the particular category to which the web page relates; and
   providing the selected advertising.

2. The method of claim 1, where determining demographics includes determining demographic tags associated with advertising that is included with the broadcast media.

3. A method comprising:
   receiving broadcast media content;
   converting the broadcast media content into textual content;
   classifying the textual content into one or more categories;
   associating, by an advertising management system comprising one or more computers, demographic information with each category that relates to an audience of the broadcast media content;
   receiving a request for providing advertising to be served with a web page that relates to a particular one of the one or more categories; and
   selecting, by the advertising management system, an advertisement to be served with the web page based on demographic information associated with the particular category to which the web page relates.

4. The method of claim 3, where classifying the textual content into one or more categories includes classifying the textual content into one or more categories based on presence of one or more topics or keywords in the textual content.

5. The method of claim 3, where:
   classifying the textual content into one or more categories includes identifying one or more topics or keywords in the textual content; and
   associating demographic information with each category includes identifying demographic information associated with the category based on the one or more topics or keywords.

6. The method of claim 3, further comprising:
   removing extraneous or irrelevant material from the textual content before classifying the textual content.

7. The method of claim 3, where the media content includes one or more audio programs, the method further comprising:
   screening the audio programs to remove commercial related data.

8. The method of claim 3, where the media content includes one or more textual transcripts, the method further comprising:
   extracting content from at least one of a group comprising terms, phrases, concepts, taxonomy categories and topics from the transcripts; and
   classifying the textual content based on the extracted content.

9. A method comprising
   receiving a first set of media content related to a particular topic from a broadcast station;
   classifying the first set of media content;
   associating, by an advertisement management system comprising one or more computers, demographic information with the classified media content and that relates to an audience of the first set of media content;
   receiving a request for providing advertising to be served with a web page that includes a second set of media content that relates to the particular topic; and
   selecting, by the advertising management system, advertising based on the demographic information associated with the classified media content to be served with the second set of media content in the web page.

10. The method of claim 9, further comprising:
    developing a classifier model based on at least one of the topic, the demographic information or the classified first and second set of media content.

11. The method of claim 10, further comprising:
identifying demographic information relating to an audience of the second set of media content using the classifier model.

12. The method of claim 9, wherein the broadcast station comprises a radio or television station.

13. A method comprising:
receiving broadcast media content;
identifying one or more features in the broadcast media content, wherein identifying one or more features in the broadcast media content comprises converting the broadcast media content into textual content;
identifying, by an advertising management system comprising one or more computers, one or more demographic groups associated with the broadcast media content based on the one or more identified features;
receiving a request for providing advertising to be served with a web page that includes content relating to one or more of the identified features; and
selecting, by the advertising management system, an advertisement to be served with the web page based on the demographic groups associated with the broadcast media content.

14. The method of claim 13, further comprising:
developing a learning model using the identified features to obtain one or more salient features.

15. A system comprising:
a processor; and
computer-readable medium coupled to the processor and having instructions stored thereon, which, when executed by the processor, causes the processor to perform operations comprising:
obtaining textual content generated from a portion of broadcast media;
classifying the portion of broadcast media into one or more categories based on the textual content;
determining demographics information for an audience of the portion of broadcast media;
associating the demographics information for the audience of the portion of broadcast media with the one or more categories;
receiving a request for providing advertising for association with a web page that relates to a particular one of the one or more categories;
selecting advertising to be served with the web page based on the demographics information associated with the particular category to which the web page relates; and
providing the selected advertising.

16. A system comprising:
a processor; and
computer-readable medium coupled to the processor and having instructions stored thereon, which, when executed by the processor, causes the processor to perform operations comprising:
receiving broadcast media content;
converting the broadcast media content into textual content;
classifying the textual content into one or more categories;
associating demographic information with each category that relates to an audience of the media content;
receiving a request for providing advertising to be served with a web page that relates to a particular one of the one or more categories; and
selecting an advertisement to be served with the web page based on demographic information associated with the particular category to which the web page relates.

17. A system comprising:
a processor; and
computer-readable medium coupled to the processor and having instructions stored thereon, which, when executed by the processor, causes the processor to perform operations comprising:
receiving a first set of media content related to a particular topic from a broadcast station;
classifying the first set of media content;
associating demographic information with the classified media content that relates to an audience of the first set of media content;
receiving a request for providing advertising to be served with a web page that includes a second set of media content that relates to the particular topic; and
selecting advertising based on the demographic information associated with the classified media content to be served with the second set of media content in the web page.

18. A system comprising:
a processor; and
computer-readable medium coupled to the processor and having instructions stored thereon, which, when executed by the processor, causes the processor to perform operations comprising:
receiving broadcast media content;
identifying one or more features in the broadcast media content, wherein identifying one or more features in the broadcast media content comprises converting the broadcast media content into textual content;
identifying, using one or more computers, one or more demographic groups associated with the broadcast media content based on the one or more identified features;
receiving a request for providing advertising to be served with a web page that includes content relating to one or more of the identified features; and
selecting an advertisement to be served with the web page based on the demographic groups associated with the broadcast media content.

19. A computer-readable storage device having instructions stored thereon, which, when executed by a processor, causes the processor to perform operations comprising:
obtaining textual content generated from a portion of broadcast media;
classifying the portion of broadcast media into one or more categories based on the textual content;
determining demographics information for an audience of the portion of broadcast media;
associating the demographics information for the audience of the portion of broadcast media with the one or more categories;
receiving a request for providing advertising for association with a web page that relates to a particular one of the one or more categories;
selecting advertising to be served with the web page based on the demographics information associated with the particular category to which the web page relates; and
providing the selected advertising.

20. A computer-readable storage device having instructions stored thereon, which, when executed by a processor, causes the processor to perform operations comprising:
receiving broadcast media content;
converting the broadcast media content into textual content;
classifying the textual content into one or more categories;
associating demographic information with each category that relates to an audience of the media content;

receiving a request for providing advertising to be served with a web page that relates to a particular one of the one or more categories; and selecting an advertisement to be served with the web page based on demographic information associated with the particular category to which the web page relates.

21. A computer-readable storage device having instructions stored thereon, which, when executed by a processor, causes the processor to perform operations comprising:

receiving a first set of media content related to a particular topic from a broadcast station;

classifying the first set of media content;

associating demographic information with the classified media content that relates to an audience of the first set of media content;

receiving a request for providing advertising to be served with a web page that includes a second set of media content that relates to the particular topic; and selecting advertising based on the demographic information associated with the classified media content to be served with the second set of media content in the web page.

22. A computer-readable storage device having instructions stored thereon, which, when executed by a processor, causes the processor to perform operations comprising:

receiving broadcast media content;

identifying one or more features in the broadcast media content, wherein identifying one or more features in the broadcast media content comprises converting the broadcast media content into textual content;

identifying, using one or more computers, one or more demographic groups associated with the broadcast media content based on the one or more identified features;

receiving a request for providing advertising to be served with a web page that includes content relating to one or more of the identified features; and selecting an advertisement to be served with the web page based on the demographic groups associated with the broadcast media content.

\* \* \* \* \*

UNITED STATES PATENT AND TRADEMARK OFFICE
CERTIFICATE OF CORRECTION

| | | |
|---|---|---|
| PATENT NO. | : 8,255,948 B1 | Page 1 of 1 |
| APPLICATION NO. | : 12/108260 | |
| DATED | : August 28, 2012 | |
| INVENTOR(S) | : Julie A. Black et al. | |

It is certified that error appears in the above-identified patent and that said Letters Patent is hereby corrected as shown below:

On Col. 16, line 55 (Claim 9), after "content" delete "and".

Signed and Sealed this
Twenty-third Day of October, 2012

David J. Kappos
*Director of the United States Patent and Trademark Office*